United States Patent
Kim et al.

(10) Patent No.: US 11,091,064 B2
(45) Date of Patent: Aug. 17, 2021

(54) VEHICLE SEAT

(71) Applicant: NHK Spring Co., Ltd., Kanagawa (JP)

(72) Inventors: Donghyoun Kim, Kanagawa (JP);
Hirotaka Nogami, Kanagawa (JP);
Katsutoshi Imanari, Kanagawa (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 16/594,131

(22) Filed: Oct. 7, 2019

(65) Prior Publication Data

US 2020/0108738 A1    Apr. 9, 2020

(30) Foreign Application Priority Data

Oct. 9, 2018  (JP) .............................. JP2018-190656

(51) Int. Cl.
*B60N 2/42* (2006.01)
*B60N 2/18* (2006.01)

(52) U.S. Cl.
CPC .................................. *B60N 2/1803* (2013.01)

(58) Field of Classification Search
CPC .......... B60N 2/68; B60N 2/643; B60N 2/642; B60N 2/22; B60N 2/02; B60N 2/7094; B60N 2/0284; B60N 2/686; B60N 2/66; B60N 2/648; B60N 2/42754; B60N 2/42745
USPC ....................................................... 297/313
See application file for complete search history.

(56) References Cited

U.S. PATENT DOCUMENTS

| | | | | |
|---|---|---|---|---|
| 5,630,240 | A  * | 5/1997 | Matsuoka | A47C 7/18 5/653 |
| 7,163,261 | B2 * | 1/2007 | Kawashima | B60N 2/42745 297/216.14 |
| 7,393,052 | B2 * | 7/2008 | Humer | B60N 2/4228 297/216.12 |
| 7,481,493 | B2 * | 1/2009 | Fujita | A47C 7/28 297/284.2 |
| 7,631,933 | B2 * | 12/2009 | Fujita | B60N 2/4228 297/216.12 |
| 7,802,853 | B2 * | 9/2010 | Ebe | B60N 2/70 297/452.27 |
| 9,108,546 | B2 * | 8/2015 | Seki | B60N 2/688 |
| 9,162,594 | B2 * | 10/2015 | Adachi | B60N 2/42745 |
| 9,387,777 | B2 * | 7/2016 | Domgorgen | B60N 2/161 |
| 10,279,714 | B2 * | 5/2019 | Line | B60N 2/565 |
| 10,328,829 | B2 * | 6/2019 | Galbreath | B60N 2/914 |
| 10,493,878 | B2 * | 12/2019 | Ketels | B60N 2/504 |
| 10,543,764 | B2 * | 1/2020 | Oshima | B60N 2/2222 |

(Continued)

FOREIGN PATENT DOCUMENTS

JP    H07-34761    6/1995

*Primary Examiner* — Shin H Kim
(74) *Attorney, Agent, or Firm* — Dority & Manning, P.A.

(57) ABSTRACT

There is provided a vehicle seat including: a left and right pair of cushion frames that structure a framework of a seat cushion, the seat cushion including a pad main body portion that supports a buttock area and thigh area of a seat occupant; a left and right pair of seat back frames; and at least one of: a seat cushion push-up mechanism that is provided inside the seat cushion uniformly across a whole of the pad main body portion in the seat width direction, or a seat back push-out mechanism that is provided inside the seat back uniformly across a whole of the back pad main body portion in the seat width direction.

7 Claims, 12 Drawing Sheets

(56) References Cited

U.S. PATENT DOCUMENTS

| | | | | |
|---|---|---|---|---|
| 2002/0060493 | A1* | 5/2002 | Nishino | B60N 2/70 297/452.56 |
| 2002/0096932 | A1* | 7/2002 | Fujita | B60N 2/58 297/452.56 |
| 2006/0169863 | A1* | 8/2006 | Ohtsubo | B60N 2/0735 248/429 |
| 2007/0152483 | A1* | 7/2007 | Fujita | B60N 2/1605 297/284.1 |
| 2008/0012407 | A1* | 1/2008 | Ebe | B60N 2/70 297/229 |
| 2008/0129092 | A1* | 6/2008 | Omori | B60N 2/865 297/216.1 |
| 2009/0001785 | A1* | 1/2009 | Swan | B60N 2/42727 297/216.12 |
| 2009/0289479 | A1* | 11/2009 | Kumagai | B60N 2/42718 297/216.1 |
| 2011/0272978 | A1* | 11/2011 | Nitsuma | B60N 2/888 297/216.12 |
| 2012/0153658 | A1* | 6/2012 | Kanda | B60N 2/682 296/65.13 |
| 2013/0069405 | A1* | 3/2013 | Schehl | B60N 2/1814 297/313 |
| 2013/0161993 | A1* | 6/2013 | Otsuka | B60N 2/3043 297/354.12 |
| 2013/0264849 | A1* | 10/2013 | Adachi | B60N 2/4228 297/216.1 |
| 2013/0285426 | A1* | 10/2013 | Arant | B60N 2/665 297/284.1 |
| 2013/0313875 | A1* | 11/2013 | Brncick | B60N 2/7094 297/311 |
| 2013/0334862 | A1* | 12/2013 | Gibbs | B60N 2/68 297/452.18 |
| 2014/0225407 | A1* | 8/2014 | Nagayasu | B60N 2/5825 297/344.1 |
| 2014/0265501 | A1* | 9/2014 | Line | B60N 2/36 297/341 |
| 2015/0202998 | A1* | 7/2015 | Komatsubara | B60N 2/0732 297/216.1 |
| 2015/0343924 | A1* | 12/2015 | Takeuchi | B60N 2/39 297/314 |
| 2015/0375647 | A1* | 12/2015 | Behrens | B60N 2/1695 297/325 |
| 2016/0250957 | A1* | 9/2016 | Yoo | B60N 2/6673 297/284.7 |

* cited by examiner

VEHICLE SEAT

CROSS-REFERENCE TO RELATED APPLICATION

This application is based on and claims priority under 35 USC 119 from Japanese Patent Application No. 2018-190656 filed on Oct. 9, 2018, the disclosure of which is incorporated by reference herein.

BACKGROUND

Technical Field

The present disclosure relates to a vehicle seat.

Related Art

Japanese Utility Model Application Laid-Open (JP-U) No. H07-34761 discloses a vehicle seat in which a bag body is provided at a joint portion between a seat cushion and a seat back, compressed air is sealed inside the bag body, and the bag body supports the sacrum area of a seat occupant.

However, depending on the body shape of a seat occupant, a bag body that is provided from the outer side of a joint region between a seat cushion and a seat back, as in the vehicle seat recited in JP-U No. H07-34761, may be able to support a sacrum lower area but not to support a sacrum upper area, as a result of which support of the sacrum area may not be stable. If the bag body is accordingly formed to be larger in order to support the sacrum upper area, a gap between the seat cushion and the buttock area of the occupant or a gap between the seat back and the back area of the occupant may be larger. As a result, body pressure of the seat occupant against the seat cushion or seat back may be concentrated in a particular region and, if the sitting state continues for a long time, the seat occupant may feel discomfort or pain.

SUMMARY

In consideration of the circumstances described above, the present disclosure provides a vehicle seat that may moderate discomfort and pain of a seat occupant in long-duration running.

A vehicle seat according to a first aspect of the present disclosure includes: a left and right pair of cushion frames that structure a framework of a seat cushion, the seat cushion including a pad main body portion that supports a buttock area and thigh area of a seat occupant; a left and right pair of seat back frames that structure a framework of a seat back, the seat back standing from a seat rear end side of the seat cushion, the seat back being supported to be tiltable in the seat front-and-rear direction about a rotation axis that is a side of the seat back at which a connection portion thereof with the left and right pair of cushion frames is disposed, and the seat back including a back pad main body portion that supports a back area of the seat occupant; and at least one of a seat cushion push-up mechanism that is provided inside the seat cushion uniformly across the whole of the pad main body portion in the seat width direction and that is capable of pushing a rear portion of the seat cushion up to the seat upper side, and a seat back push-out mechanism that is provided inside the seat back uniformly across the whole of the back pad main body portion in the seat width direction and that is capable of pushing a lower portion of the seat back out to the seat front side, the lower portion of the seat back including a region opposing a sacrum area of the seat occupant.

According to the vehicle seat according to the first aspect of the present disclosure, the rear portion of the seat back is pushed up toward the seat upper side by the seat cushion push-up mechanism and/or the lower portion of the seat back including the region opposing the sacrum area of the seat occupant is pushed out toward the seat front side by the seat back push-out mechanism. Consequently, the gap formed between the joint region of the seat cushion and seat back and the buttock area of the seat occupant may be made smaller, and the buttock area of the seat occupant may be put into area contact with the vehicle seat. Furthermore, because the seat cushion push-up mechanism and the seat back push-out mechanism are provided uniformly in the seat width direction across the whole of the pad main body portion and the whole of the back pad main body portion, the seat occupant is stably supported by the vehicle seat regardless of the body shape of the seat occupant. Therefore, because the sacrum area of the seat occupant is stably supported by the vehicle seat, discomfort, pain and the like of the seat occupant during long-duration running may be reduced.

In a vehicle seat according to a second aspect of the present disclosure, in the vehicle seat according to the first aspect, the rear portion of the seat cushion can be pushed up so as to be angled to the seat upper side toward the seat rear side.

According to the vehicle seat according to the second aspect of the present disclosure, the rear portion of the seat cushion is pushed up by the seat cushion push-up mechanism so as to be angled to the seat upper side toward the seat rear side. Consequently, the gap formed between the joint region of the seat cushion and seat back and the buttock area of the seat occupant may be made smaller, and the buttock area of the seat occupant may be put into area contact with the vehicle seat. Therefore, because the sacrum area of the seat occupant is stably supported by the vehicle seat, discomfort, pain and the like of the seat occupant during long-duration running may be moderated.

In a vehicle seat according to a third aspect of the present disclosure, in the vehicle seat according to the first aspect or second aspect, the lower portion of the seat back can be pushed out so as to be angled to the seat front side toward the seat lower side.

According to the vehicle seat according to the third aspect of the present disclosure, the lower portion of the seat back is pushed out by the seat back push-out mechanism so as to be angled to the seat front side toward the seat lower side. Consequently, the gap formed between the joint region of the seat cushion and seat back and the buttock area of the seat occupant may be made smaller, and the buttock area of the seat occupant may be put into area contact with the vehicle seat. Therefore, because the sacrum area of the seat occupant is stably supported by the vehicle seat, discomfort, pain and the like of the seat occupant during long-duration running may be moderated.

In a vehicle seat according to a fourth aspect of the present disclosure, in the vehicle seat according to any one of the first to third aspects, the seat cushion includes a cushion pad including: the pad main body portion; a left and right pair of pad side portions provided at the sides at both ends in the seat width direction of the pad main body portion; a left and right pair of first slit portions provided at the rear portion of the seat cushion along boundaries between the pad main body portion and the left and right pair of pad side portions;

and a second slit portion provided along the seat width direction at a rear end portion of the pad main body portion.

According to the vehicle seat according to the fourth aspect of the present disclosure, the first slit portions and the second slit portion are provided in the cushion pad. Consequently, tension in the cushion pad when the rear portion of the seat cushion is being pushed up to the seat upper side by the seat cushion push-up mechanism may be reduced, and the seat cushion may be put into area contact with the buttock area of the seat occupant more effectively. Therefore, because the sacrum area of the seat occupant is stably supported by the vehicle seat, discomfort, pain and the like of the seat occupant during long-duration running may be moderated.

In a vehicle seat according to a fifth aspect of the present disclosure, in the vehicle seat according to any one of the first to fourth aspects, the seat back includes a back pad including: the back pad main body portion; a left and right pair of back pad side portions provided at the sides at both ends in the seat width direction of the back pad main body portion; and a left and right pair of back slit portions provided at the lower portion of the seat back along boundaries between the back pad main body portion and the left and right pair of back pad side portions.

According to the vehicle seat according to the fifth aspect of the present disclosure, the back slit portions are provided in the back pad. Consequently, tension in the back pad when the lower portion of the seat back is being pushed out to the seat front side by the seat back push-out mechanism may be reduced, and the seat back may be put into area contact with the buttock area of the seat occupant more effectively. Therefore, because the sacrum area of the seat occupant is stably supported by the vehicle seat, discomfort, pain and the like of the seat occupant during long-duration running may be moderated.

In a vehicle seat according to a sixth aspect of the present disclosure, in the vehicle seat according to any one of the first to fifth aspects, the seat cushion push-up mechanism includes: a push-up portion provided at the rear portion of the seat cushion across the whole of the pad main body portion in the seat width direction, the push-up portion pushing the rear portion of the seat cushion up to the seat upper side; and a push-up driving portion that is provided at the seat cushion and drives the push-up portion to cause the push-up portion to move up and down.

According to the vehicle seat according to the sixth aspect of the present disclosure, the rear portion of the seat cushion is pushed up to the seat upper side by the push-up driving portion driving the push-up portion. Consequently, the seat cushion may be put into area contact with the buttock area of the seat occupant assuredly. Therefore, because the sacrum area of the seat occupant is stably supported by the vehicle seat, discomfort, pain and the like of the seat occupant during long-duration running may be moderated.

In a vehicle seat according to a seventh aspect of the present disclosure, in the vehicle seat according to any one of the first to sixth aspects, the seat back push-out mechanism includes: a push-out portion provided at the lower portion of the seat back across the whole of the back pad main body portion in the seat width direction, the push-out portion pushing the lower portion of the seat cushion out to the seat front side; and a push-out driving portion that is provided at the seat back and drives the push-out portion to cause the push-out portion to move to front and rear.

According to the vehicle seat according to the seventh aspect of the present disclosure, the lower portion of the seat back is pushed out to the seat front side by the push-out driving portion driving the push-out portion. Consequently, the seat back may be put into area contact with the buttock area of the seat occupant assuredly. Therefore, because the sacrum area of the seat occupant is stably supported by the vehicle seat, discomfort, pain and the like of the seat occupant during long-duration running may be moderated.

As described above, the vehicle seat according to the present disclosure provides an excellent effect of moderating discomfort, pain and the like of a seat occupant in long-duration running.

BRIEF DESCRIPTION OF THE DRAWINGS

Exemplary embodiments of the present disclosure will be described in detail based on the following figures, wherein.

DETAILED DESCRIPTION

Figure 1:
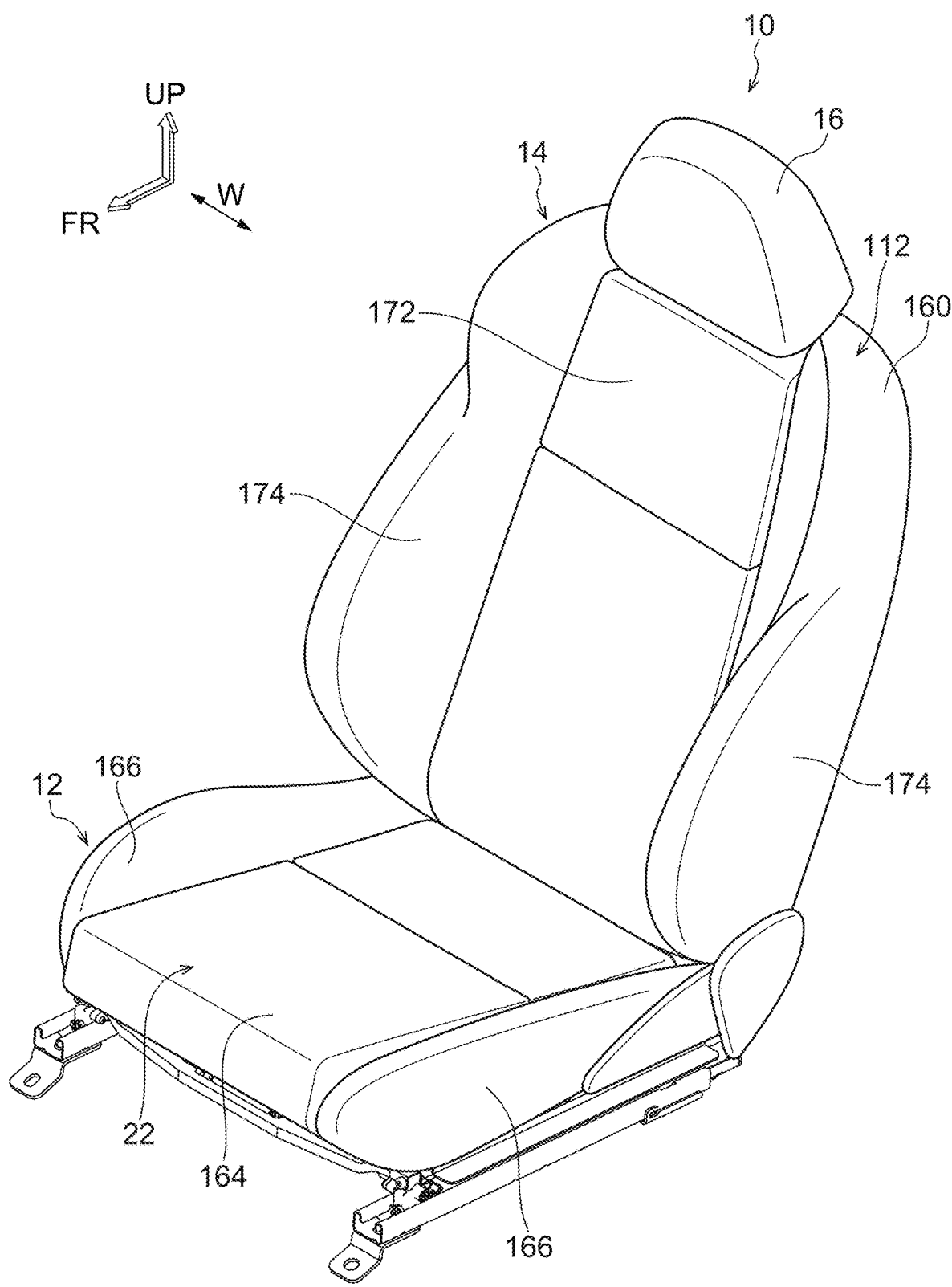
FIG. 1 is a perspective view of a vehicle seat according to a present exemplary embodiment.

Below, a vehicle seat 10, which is an example of an embodiment of the present disclosure, is described using FIG. 1 to FIG. 12. In the drawings, an arrow FR indicates a seat front side, an arrow UP indicates a seat upper side, and an arrow W indicates a seat width direction. The rightward direction when facing to the seat front side is defined as the seat right side and the leftward direction is defined as the seat left side. In the present exemplary embodiment, the front side, upper side and width direction of the vehicle seat 10 match a front side, upper side and width direction of a vehicle.

FIG. 1 shows the exterior of the vehicle seat 10 in a perspective view. The vehicle seat 10 includes a seat cushion 12 for supporting the buttock area and thigh area of a vehicle occupant, a seat back 14 for supporting the back area of the vehicle occupant, and a headrest 16 for supporting the head area of the vehicle occupant. The seat back 14 stands from the seat rear end side of the seat cushion 12. The seat back 14 is supported to be tiltable in the seat front-and-rear direction about the side of the seat back 14 at which a connection portion with a cushion frame is disposed.

Figure 2:
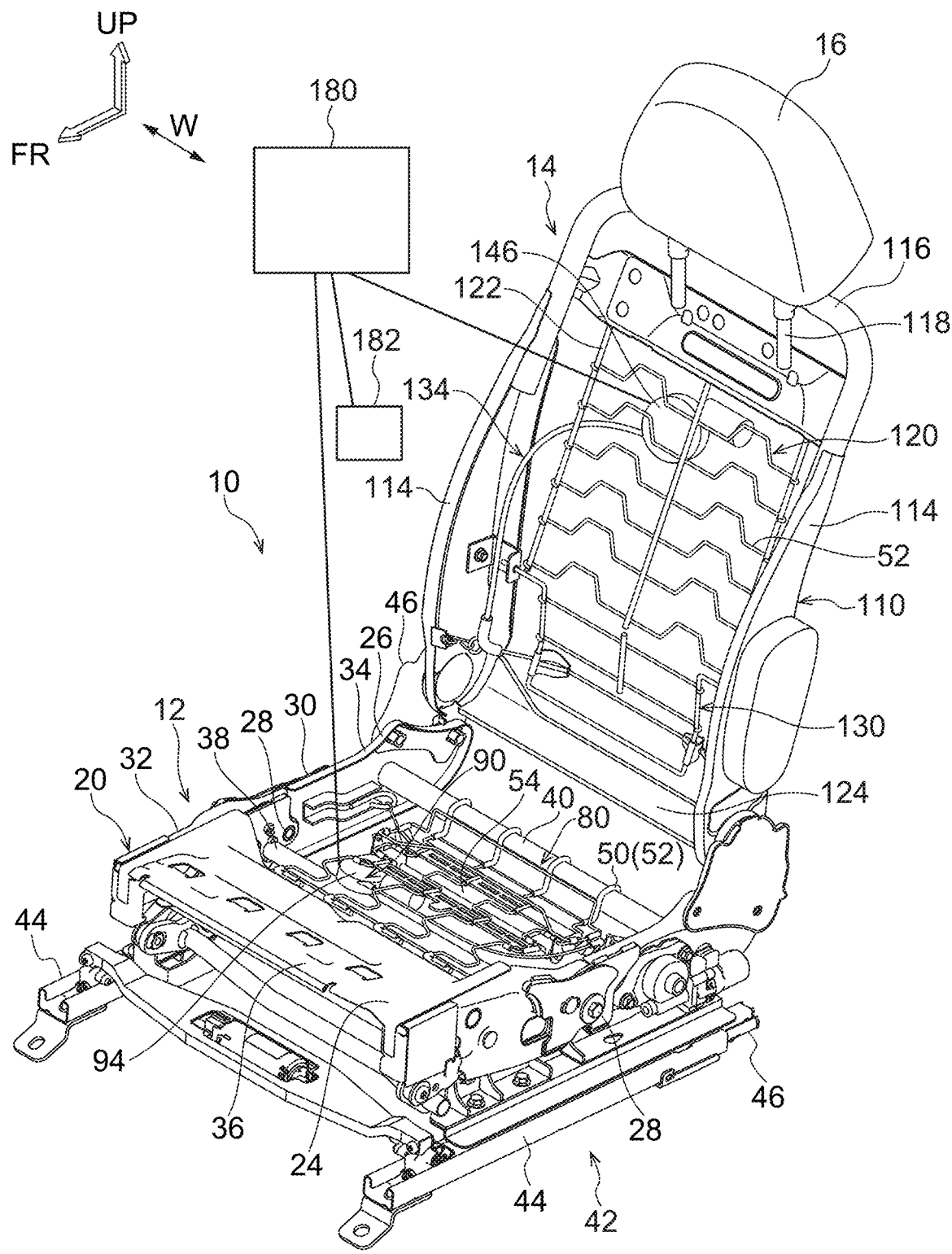
FIG. 2 is a perspective view of frame parts of the vehicle seat according to the present exemplary embodiment.

As shown in FIG. 1 and FIG. 2, the seat cushion 12 is formed with a cushion pad 22 attached to a cushion frame 20 that structures a framework of the seat cushion 12. As shown in FIG. 2, the cushion frame 20 is structured by a cushion frame front portion 24 constituting a front portion and a cushion frame rear portion 26 constituting a rear portion being turnably linked via a left and right pair of shoulder bolts 28. The left and right pair of shoulder bolts 28 are coaxially disposed with axial directions in the seat width direction.

A left and right pair of cushion side frames 30 at both ends in the seat width direction of the cushion frame 20 include a left and right pair of front-side side frames 32 that structure the cushion frame front portion 24 and a left and right pair of rear-side side frames 34 that structure the cushion frame rear portion 26. More specifically, the cushion side frames 30 are structured by the front-side side frames 32 and rear-side side frames 34 being turnably linked via the left and right shoulder bolts 28.

The cushion frame front portion 24 includes the left and right pair of front-side side frames 32, a front frame 36 and a pipe frame 38. The front frame 36 spans between upper end portions of front portions of the left and right pair of front-side side frames 32. The pipe frame 38 spans between rear end portions of the left and right front-side side frames 32. The left and right pair of front-side side frames 32 and the front frame 36 are formed of, for example, metal plates, and the pipe frame 38 is formed of, for example, a pipe fabricated of metal.

The cushion frame rear portion 26 includes the left and right pair of rear-side side frames 34 and a rear frame 40 at the seat rear side that spans between the left and right rear-side side frames 34. The left and right pair of rear-side side frames 34 are formed of, for example, metal plates, and the rear frame 40 is formed of, for example, a pipe fabricated of metal.

Seat cushion springs 50 span between the upper sides of the pipe frame 38 and the rear frame 40. In this exemplary embodiment, the seat cushion springs 50 are constituted by a plural number (four) of formed wires 52. The formed wires 52 are structured by S-springs coated with resin.

Seat sliding mechanisms 42 are provided at the seat lower side of the left and right pair of cushion side frames 30. The seat sliding mechanisms 42 include a left and right pair of lower rails 44 that serve as fixed rails and a left and right pair of upper rails 46 that serve as movable rails. The lower rails 44 are provided at the vehicle lower side of both ends in the seat width direction of the seat cushion 12. The seat sliding mechanisms 42 are structured to enable adjustment of the position of the vehicle seat 10 manually or electrically.

Figure 3:
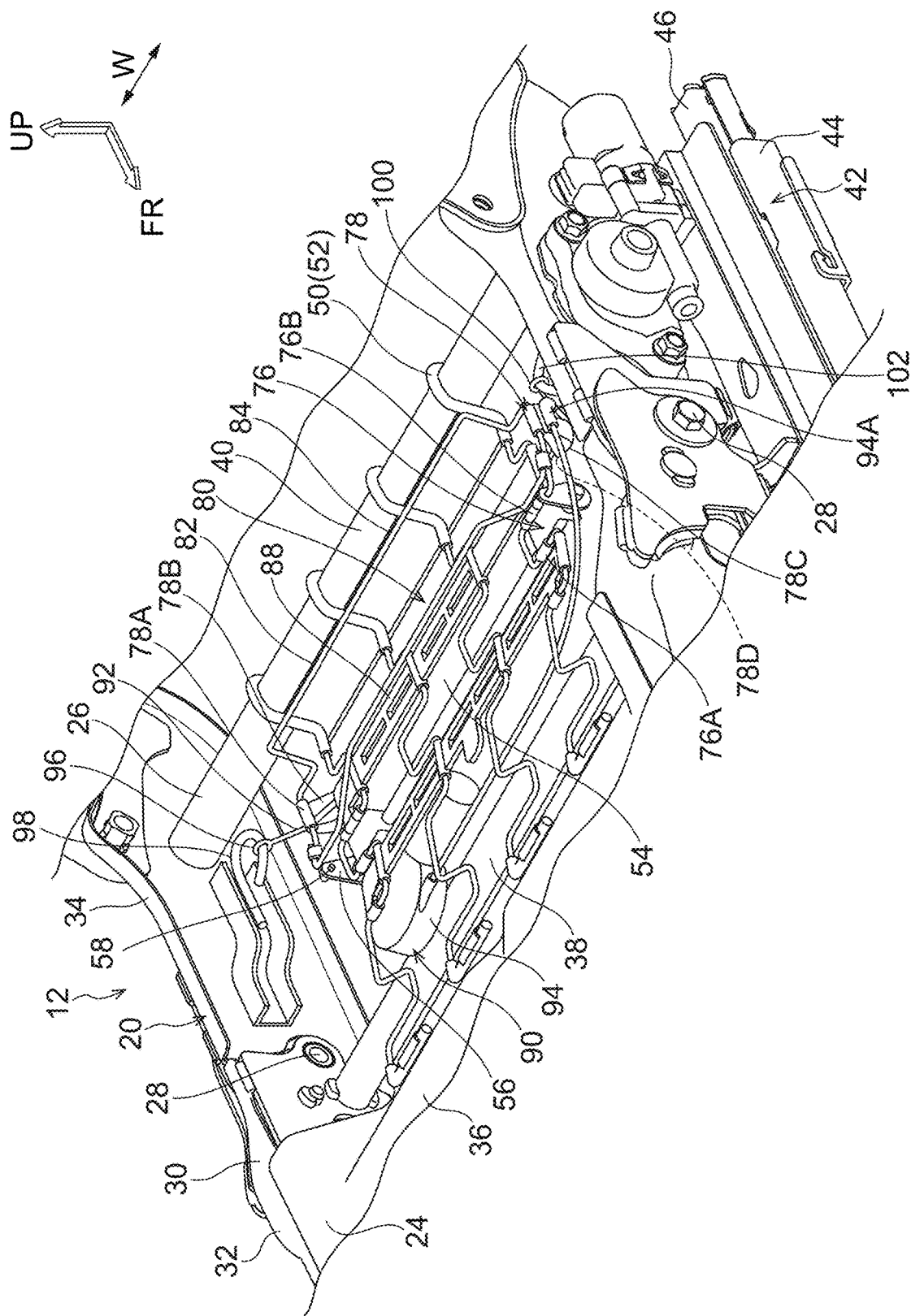
FIG. 3 is a plan view of a seat cushion push-up mechanism according to the present exemplary embodiment.

As shown in FIG. 3, an attachment bracket 54 fabricated of metal is attached to the seat lower side of substantially central portions in the seat front-and-rear direction of the seat cushion springs 50. The attachment bracket 54 is formed in a circular rod shape and extends in the seat width direction at the seat lower side of the seat cushion springs 50. A left and right pair of hinge portions 56 are provided at both ends in the seat width direction of the attachment bracket 54. The hinge portions 56 are formed of metal plates with plate thickness directions in the seat width direction. A left and right pair of insertion holes 58 are formed in the seat upper sides of the hinge portions 56. The insertion holes 58 penetrate through the hinge portions 56 in the plate thickness directions thereof. The left and right pair of insertion holes 58 are disposed coaxially with axial directions in the seat width direction.

Attachment pieces 76 are provided at the seat cushion springs 50 at the seat width direction inner sides of the hinge portions 56 of the attachment bracket 54. Attachment portions 76A and 76B are formed at the seat front end and rear end of each attachment piece 76. The attachment pieces 76 are attached to the seat cushion springs 50 by the attachment portions 76A and 76B being crimped to the formed wires 52.

A seat cushion push-up mechanism 80 is provided at the seat upper side of the seat rear side of the seat cushion springs 50. The seat cushion push-up mechanism 80 includes a push-up portion 82 and a push-up driving portion 90. The push-up portion 82 is disposed uniformly in the seat width direction across the whole of a pad main body portion 164 (see FIG. 1), which is described below. The push-up driving portion 90 drives the push-up portion 82.

The push-up portion 82 includes a push-up wire 84 and a first support wire 88. The push-up wire 84 pushes a rear portion of the seat cushion 12 up to the seat upper side. The first support wire 88 is for preventing warping of the push-up wire 84. The push-up portion 82 is structured by another of the formed wires 52. In plan view, the push-up portion 82 is formed substantially in a "U" shape that is open to the seat front side. The seat rear side of the push-up wire 84 extends in the seat width direction along the rear frame 40. In a front view seen from the front of the vehicle seat 10, the seat rear side of the push-up wire 84 is formed in a substantially trapezoid shape protruding to the seat upper side.

Front ends of the two sides in the seat width direction of the push-up wire 84 are inflected toward the seat width direction inner sides thereof and turnably inserted into the insertion holes 58 of the hinge portions 56. At the seat front side of the push-up wire 84, the first support wire 88 spans between both sides in the seat width direction of the push-up wire 84.

A first motor 94 that constitutes the push-up driving portion 90 is mounted at the seat lower side of the seat cushion springs 50 at the seat front side of the push-up portion 82. The push-up driving portion 90 includes a left and right pair of first cable wire attachment pieces 78 and the first motor 94. The first cable wire attachment pieces 78 are attached to substantially central portions in the seat front-and-rear direction of the push-up wire 84. The first motor 94 takes up a cable wire 92, which is attached to the first cable wire attachment pieces 78. In order to detect a rotary position of an output shaft of the first motor 94, for example, an encoder is provided at the first motor 94.

The left and right pair of first cable wire attachment pieces 78 are formed in substantially tubular shapes and each includes an upper end portion 78A, an end portion 78B and an inner side portion 78C. The upper end portion 78A is turnably attached to the push-up wire 84. The end portion 78B is formed toward the seat lower side from the upper end portion 78A. The inner side portion 78C is formed toward the seat width direction inner side from the end portion 78B. In a front view seen from the front of the vehicle seat 10, the left and right pair of first cable wire attachment pieces 78 are formed in a substantial "L" shape and a substantial reverse "L" shape by the end portions 78B and inner side portions 78C.

A tubular portion 78D that is formed in a tubular shape in the seat width direction is provided at the lower face side (seat lower side) of a substantially central portion in the seat front-and-rear direction of each inner side portion 78C. The first cable wire attachment pieces 78 are attached to the push-up wire 84 in a state in which the cable wire 92 is inserted into the left and right pair of tubular portions 78D.

A right side terminal 96 formed in a ring shape is crimped to an end portion at the seat right side of the cable wire 92. The right side terminal 96 is hooked onto a right side hook portion 98 that is provided at the cushion side frame 30 at the seat right side. At the seat left side of the tubular portion 78D of the first cable wire attachment piece 78 that is at the seat left side, the cable wire 92 is inserted into a substantially tubular cover portion 94A that extends toward the seat left side from the first motor 94. The cable wire 92 is connected with the interior of the first motor 94. A left side terminal 100 formed in a ring shape is crimped to a distal end portion (seat left side end portion) of the cover portion 94A. The left side terminal 100 is hooked onto a left side hook portion 102 that is provided at the cushion side frame 30 at the seat left side.

As shown in FIG. 1 and FIG. 2, the seat back 14 standing from the seat rear end side of the seat cushion 12 is formed with a back pad 112 attached to a seat back frame 110 that structures a framework of the seat back 14.

As shown in FIG. 2, the seat back frame 110 includes a left and right pair of back side frames 114, which are provided at both ends in the seat width direction of the seat back frame 110, and an upper pipe 116, which is provided at the seat upper side of the seat back frame 110.

The back side frames 114 are formed of metal plates with plate thickness directions in the seat width direction, which extend in the seat vertical direction. Seat front side end portions and seat rear side end portions of the back side frames 114 are respectively inflected toward the seat width direction middle.

The upper pipe 116 is formed in a tubular shape of a metal material. The seat upper side of the upper pipe 116 extends in the seat width direction, and the upper pipe 116 extends to the seat lower side from both end portions in the seat width direction of the seat upper side. The two lower ends of the upper pipe 116 extending to the seat lower side are connected to respective upper ends of the left and right pair of back side frames 114. A headrest frame 118 that structures a framework of the headrest 16 is connected to the upper pipe 116.

Seat back springs 120 are provided at the seat lower side of the headrest frame 118. The seat back springs 120 are constituted by a plural number (six) of the formed wires 52 spanning between a left and right pair of wire portions 122 that extend to the seat lower side. At the seat lower side of the seat back springs 120, a lower portion frame 124 spans between the left and right pair of back side frames 114.

Figure 4:
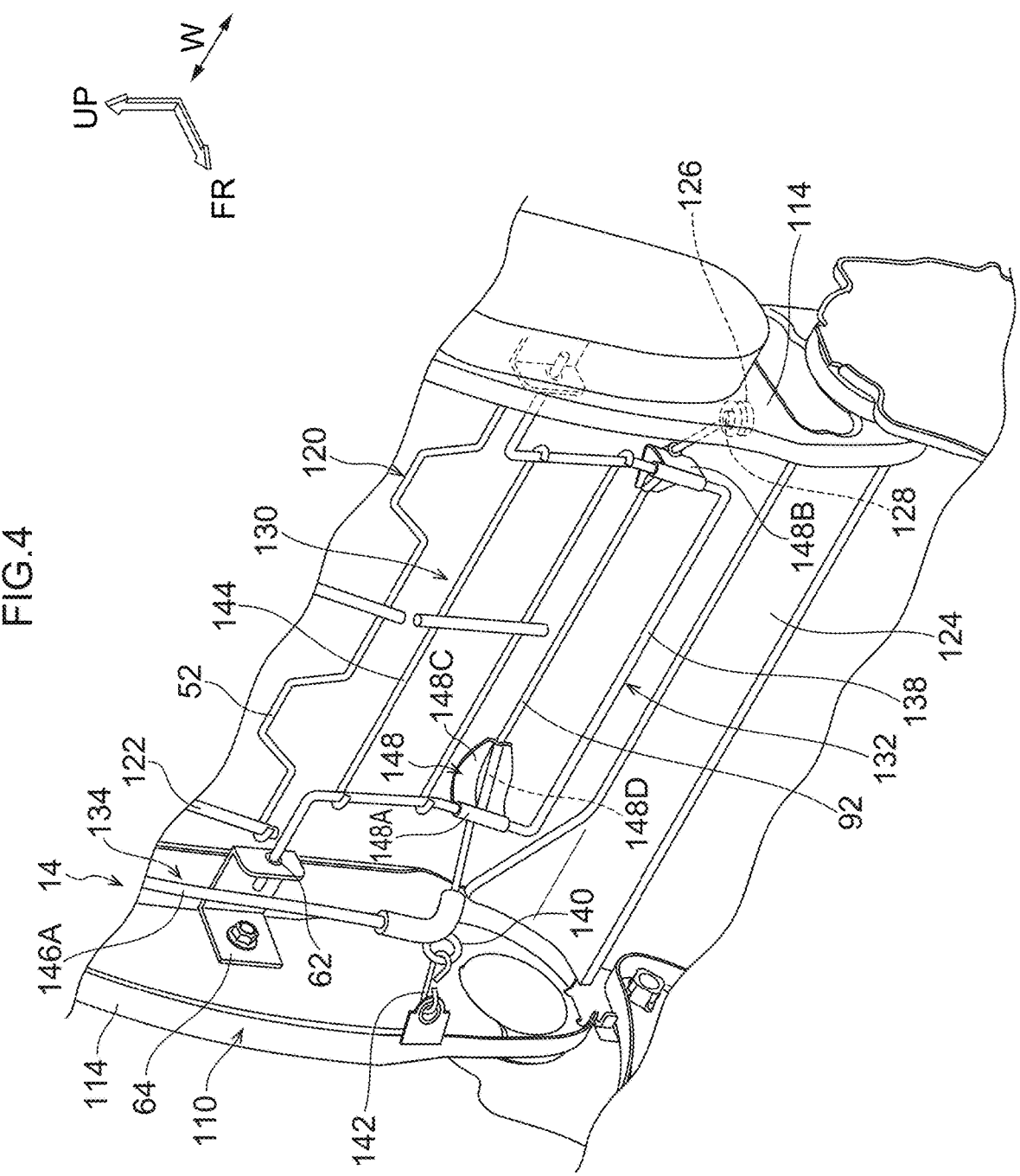
FIG. 4 is a perspective view in which a seat back push-out mechanism according to the present exemplary embodiment is seen from a seat front side.
Figure 8:
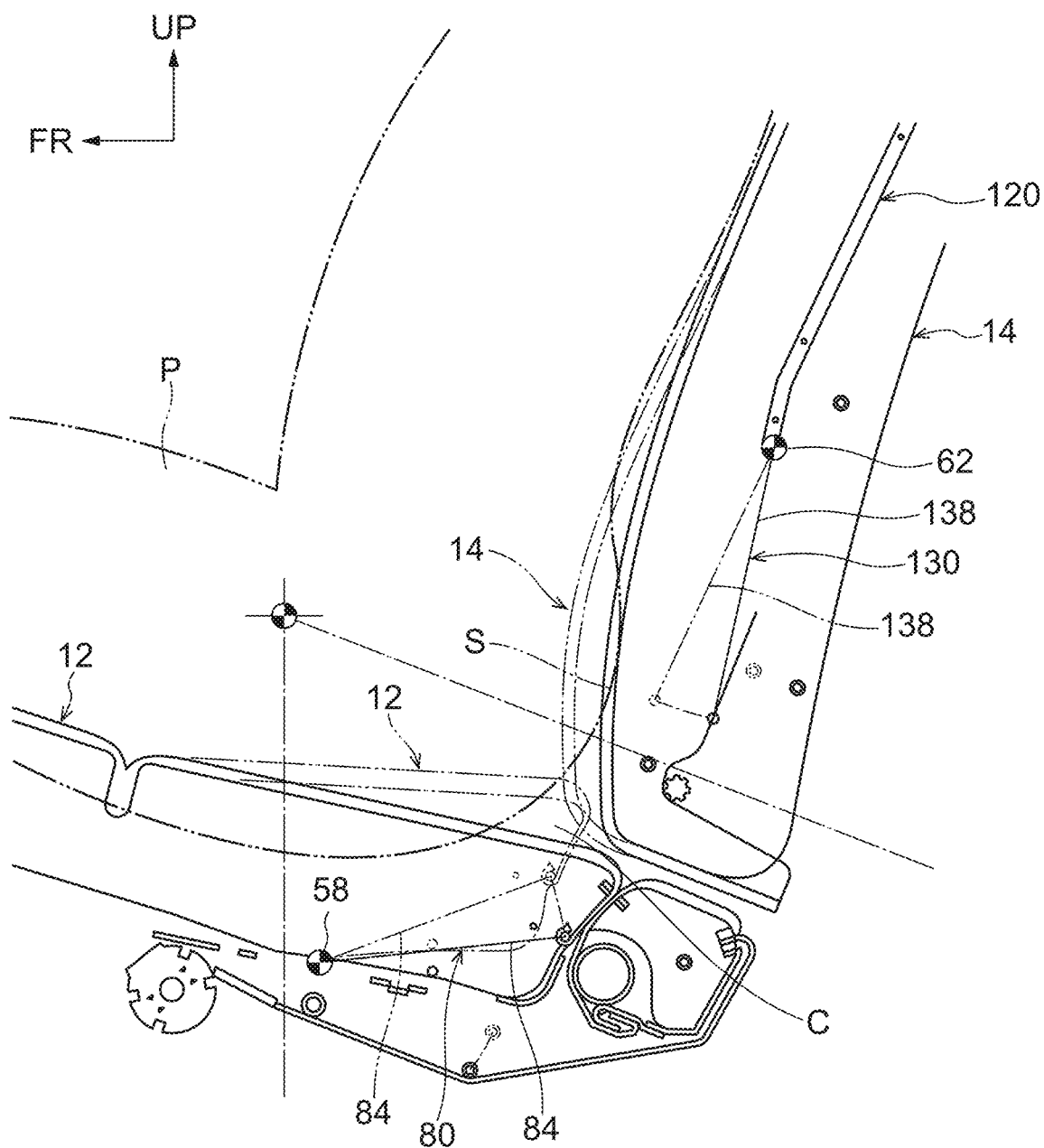
FIG. 8 is a vertical sectional view of the vehicle seat shown in FIG. 7, showing a state in which the vehicle seat is cut along line 8-8 in FIG. 7.

As shown in FIG. 4, a seat back push-out mechanism 130 is provided at a lower portion of the left and right pair of back side frames 114, including a region opposing a sacrum area S of a seat occupant P (see FIG. 8). The seat back push-out mechanism 130 includes a push-out portion 132 and a push-out driving portion 134. The push-out portion 132 is disposed uniformly in the seat width direction across the whole of a back pad main body portion 172 (see FIG. 1), which is described below. The push-out driving portion 134 drives the push-out portion 132.

The push-out portion 132 includes a push-out wire 138 and a plural number (two) of second support wires 144. The push-out wire 138 is attached to the left and right pair of back side frames 114. The second support wires 144 are for preventing warping of the push-out wire 138. The push-out wire 138 is structured by another of the formed wires 52. In the front view seen from the seat front side, the push-out wire 138 is formed substantially in a "U" shape that is open to the seat upper side. The seat lower side of the push-out wire 138 is inflected so as to be angled to the seat front side toward the seat lower side. At the seat upper side of the push-out wire 138, the plural (two) second support wires 144 span between both ends of the push-out wire 138 in the seat width direction.

Inner side attachment pieces 64 in plate shapes are mounted at the seat width direction inner sides of the left and right pair of back side frames 114. The inner side attachment pieces 64 include inner side insertion holes 62 that are formed to penetrate through the inner side attachment pieces 64 in the seat width direction. The inner side insertion holes 62 are disposed coaxially with axial directions in the seat width direction. Upper ends of the two sides in the seat width direction of the push-out wire 138 are inflected toward the seat width direction outer sides thereof and turnably inserted into the inner side insertion holes 62 in the inner side attachment pieces 64.

As shown in FIG. 2, a second motor 146 that constitutes the push-out driving portion 134 is mounted at the seat rear side of the seat back springs 120. In order to detect a rotary position of an output shaft of the second motor 146, for example, an encoder is provided at the second motor 146. As shown in FIG. 4, the push-out driving portion 134 includes the second motor 146 and a left and right pair of second cable wire attachment pieces 148. The second cable wire attachment pieces 148 are attached to the two end portions in the seat width direction of the push-out wire 138.

The left and right pair of second cable wire attachment pieces 148 are formed in substantially tubular shapes and each includes a front end portion 148A, an end portion 148B and an inner side portion 148C. The front end portion 148A is turnably attached to the push-out wire 138. The end portion 148B is formed toward the seat rear side from the front end portion 148A. The inner side portion 148C is formed toward the seat width direction inner side from an end portion at the seat rear side of the end portion 148B. In plan view, the left and right pair of the second cable wire attachment pieces 148 are formed in a substantial "L" shape and a substantial reverse "L" shape by the end portions 148B and inner side portions 148C.

A tubular portion 148D that is formed in a tubular shape in the seat width direction is provided at the rear face side (seat rear side) of a substantially central portion in the seat vertical direction of each inner side portion 148C. The second cable wire attachment pieces 148 are attached to the push-out wire 138 in a state in which another of the cable wire 92 is inserted into the left and right pair of tubular portions 148D.

A left side terminal 126 formed in a ring shape is crimped to an end portion at the seat left side of this cable wire 92. The left side terminal 126 is hooked onto a left side hook portion 128 that is provided at the back side frame 114 at the seat left side. At the seat right side of the tubular portion 148D of the second cable wire attachment piece 148 that is at the seat right side, the cable wire 92 is inserted into a substantially tubular cover portion 146A that extends toward the seat lower side from the second motor 146. The cable wire 92 is connected with the interior of the second motor 146. A right side terminal 140 formed in a ring shape is crimped to a distal end portion (seat lower side end portion) of the cover portion 146A. The right side terminal 140 is hooked onto a right side hook portion 142 that is provided at the back side frame 114 at the seat right side.

Figure 5:
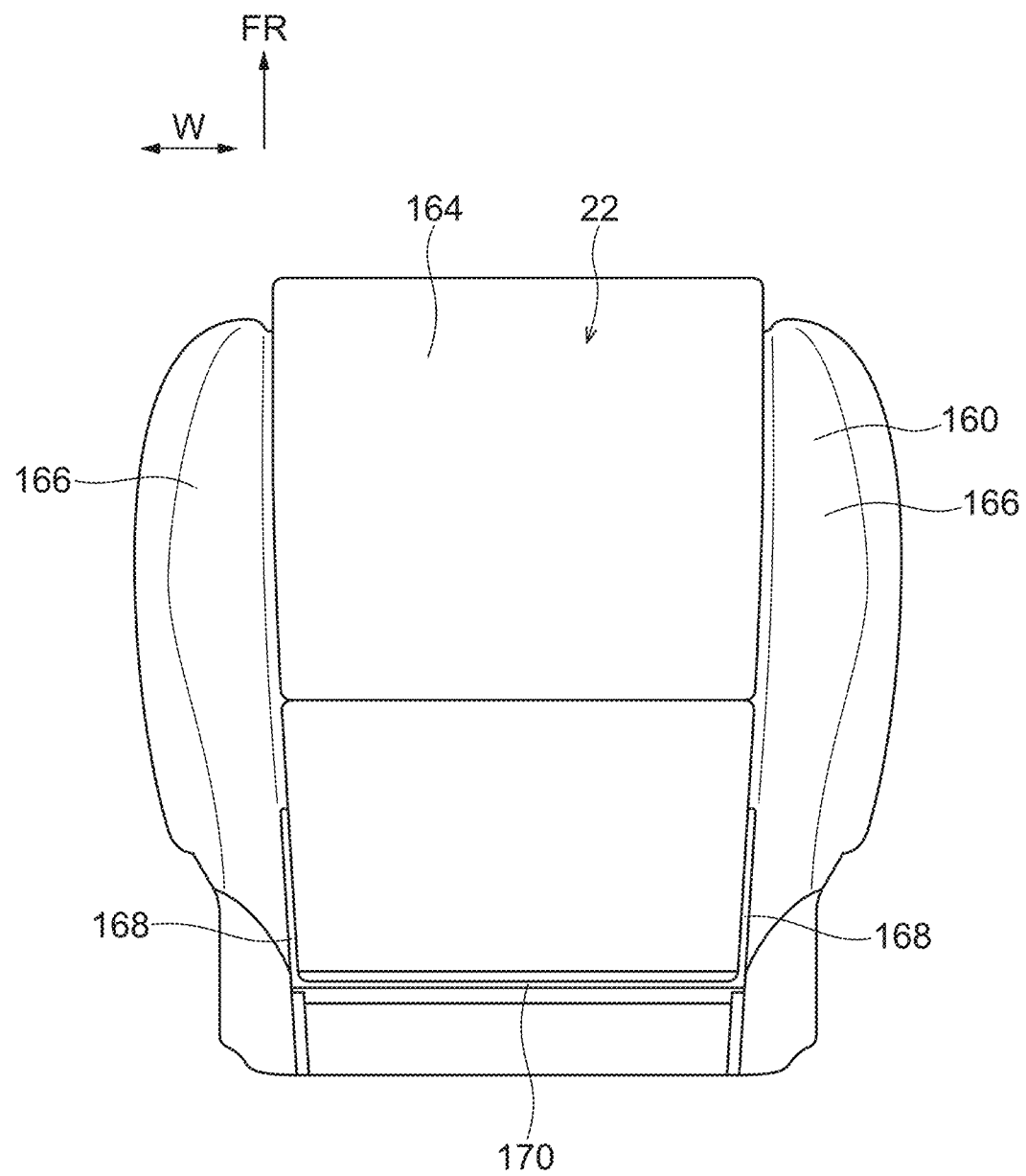
FIG. 5 is a front view in which a seat cushion according to the present exemplary embodiment is seen from the seat front side.

As shown in FIG. 5, the cushion pad 22 that is attached to the cushion frame 20 includes the pad main body portion 164 and a left and right pair of pad side portions 166. The pad main body portion 164 is provided at a central region in the seat width direction of the cushion pad 22. The pad side portions 166 are provided at both ends in the seat width direction of the pad main body portion 164.

A left and right pair of first slit portions 168 are formed in the cushion pad 22 along boundaries between the pad main body portion 164 and the left and right pair of pad side portions 166, at the rear portion of the seat cushion 12. A second slit portion 170 is formed along the seat width direction at a rear end portion of the pad main body portion 164.

Figure 6:
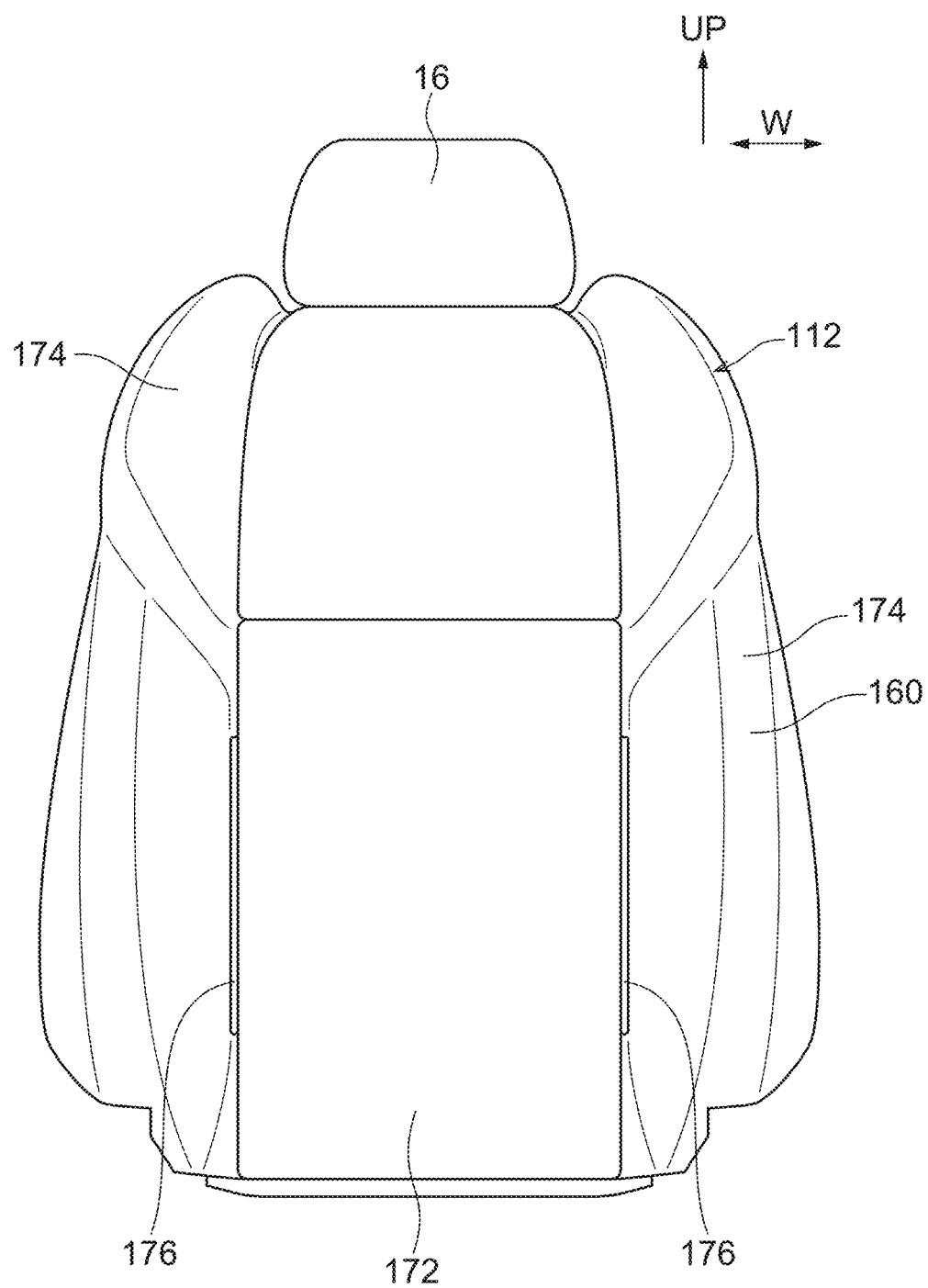
FIG. 6 is a plan view of a seat back according to the present exemplary embodiment.

As shown in FIG. 6, the back pad 112 that is attached to the seat back frame 110 includes the back pad main body portion 172 and a left and right pair of back pad side portions 174. The back pad main body portion 172 is provided at a central region in the seat width direction of the back pad 112. The back pad side portions 174 are provided at both ends in the seat width direction of the back pad main body portion 172.

A left and right pair of back slit portions 176 are formed in the back pad 112 along boundaries between the back pad main body portion 172 and the left and right pair of back pad side portions 174, at the lower portion of the seat back 14.

Figure 7:
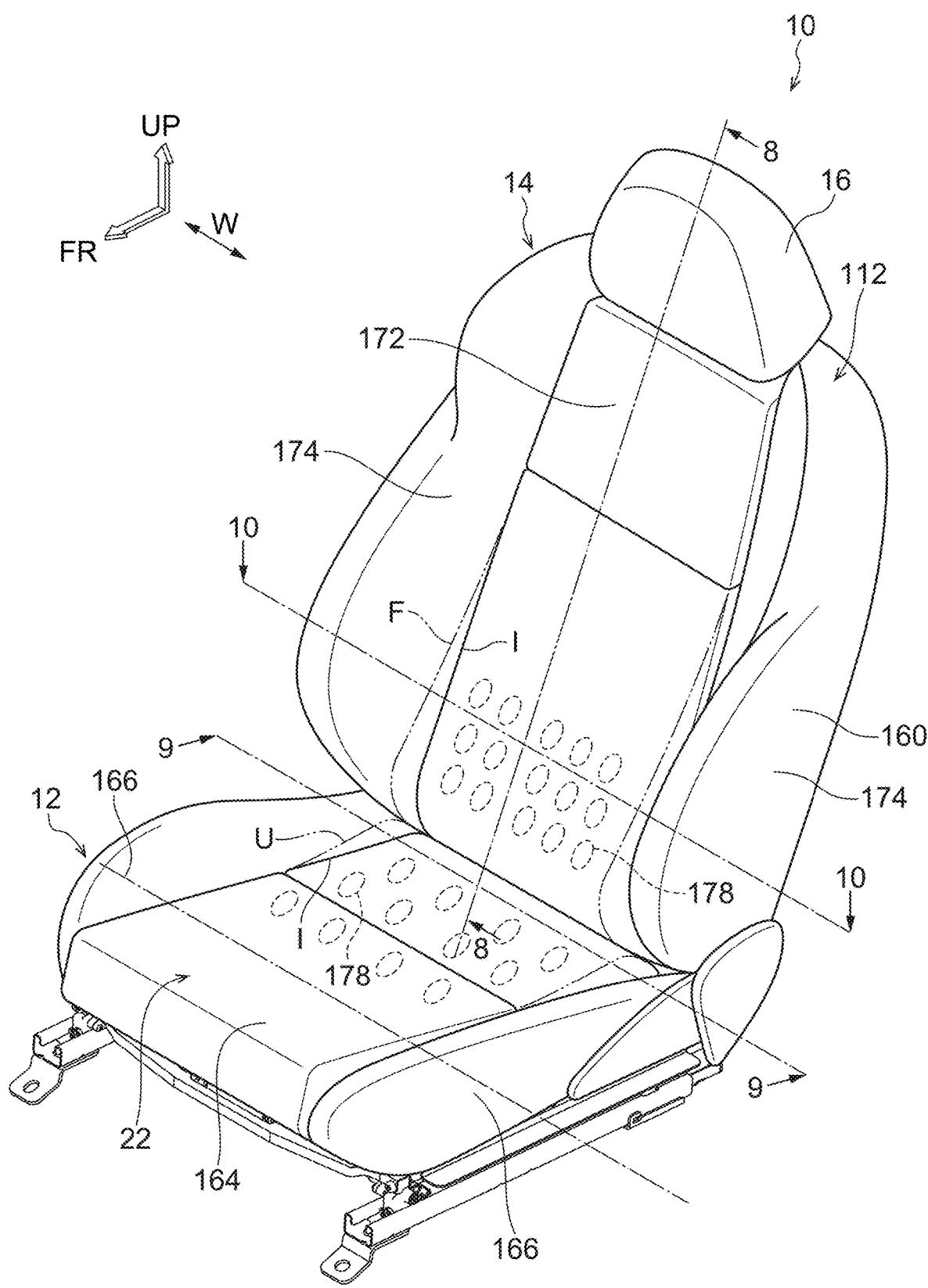
FIG. 7 is a perspective view showing a state in which a seat rear portion of the seat cushion according to the present exemplary embodiment is pushed up and a seat lower portion of the seat back is pushed out.

As shown in FIG. 7, plural pressure sensors 178 are disposed inside the cushion pad 22 at regions of the rear portion of the seat cushion 12 that are compressed by the buttock area and thigh area of the seat occupant P. Thus, body pressures of the buttock area and thigh area of the seat occupant P may be measured. Others of the plural pressure sensors 178 are provided inside the back pad 112 at the lower portion of the seat back 14. Thus, body pressures of the back area and the vicinity of the sacrum area S (see FIG. 8) of the seat occupant P may be measured.

ECU

As shown in FIG. 2, the first motor 94, the second motor 146 and the pressure sensors 178 are electronically connected to an electronic control unit (ECU) 180 of the vehicle in which the vehicle seat 10 is provided. The ECU 180 is constituted with a microcomputer in which a CPU, ROM, RAM and input/output interface (I/O) are connected to a bus. More specifically, the first motor 94, the second motor 146 and the pressure sensors 178 are electronically connected to the I/O of the ECU 180. Motors for driving the seat sliding mechanisms 42 and so forth are also electronically connected to the I/O of the ECU 180.

An operation unit 182 is provided, for example, at a side face of the seat cushion 12 or the like. The operation unit 182 is electronically connected to the I/O of the ECU 180. Switches for operating and stopping the first motor 94 and the second motor 146 are provided at the operation unit 182. Switches for seat-sliding, reclining and the like are also provided at the operation unit 182. In response to operations of the switches of the operation unit 182 by the seat occupant P, the ECU 180 controls operations of the first motor 94, the second motor 146 and so forth.

Operation and Effects

Now, operation and effects of the present exemplary embodiment are described.

According to the vehicle seat 10 according to the present exemplary embodiment, when a switch provided at the operation unit 182 is operated, the ECU 180 causes the first motor 94 to operate. The operating first motor 94 takes up the cable wire 92 thereat into the first motor 94. As a result, tension is produced in the cable wire 92, which pushes up the left and right pair of first cable wire attachment pieces 78 to the seat upper side. Consequently, the push-up portion 82 is turned toward the seat upper side about the left and right pair of portions of the push-up wire 84 that are inserted into the insertion holes 58. Thus, as shown in FIG. 7, the push-up portion 82 is pushed up from an initial position I (the solid line in FIG. 7) to a push-up position U at the seat upper side (the two-dot chain line in FIG. 7).

Further, when a switch provided at the operation unit 182 is operated, the ECU 180 causes the second motor 146 to operate. The operating second motor 146 takes up the cable wire 92 thereat into the second motor 146. As a result, tension is produced in the cable wire 92, which pushes out the left and right pair of second cable wire attachment pieces 148 to the seat front side. Consequently, the push-out portion 132 is turned about the portions of the push-out wire 138 that are inserted into the inner side insertion holes 62. Thus, as shown in FIG. 7, the push-out portion 132 is pushed out from the initial position I (the solid line in FIG. 7) to a push-out position F at the seat front side (the two-dot chain line in FIG. 7).

According to the vehicle seat 10 according to the present exemplary embodiment, as shown in FIG. 8, a gap C formed between the seat cushion 12 and the buttock area of the seat occupant P may be made smaller by the rear portion of the seat cushion 12 being pushed up to the seat upper side. In addition, the gap C formed between the seat back 14 and the buttock area of the seat occupant P may be made smaller by the lower portion of the seat back 14 being pushed out to the seat front side. As a result, the buttock area of the seat occupant P may be put into area contact with the vehicle seat 10.

Figure 9:
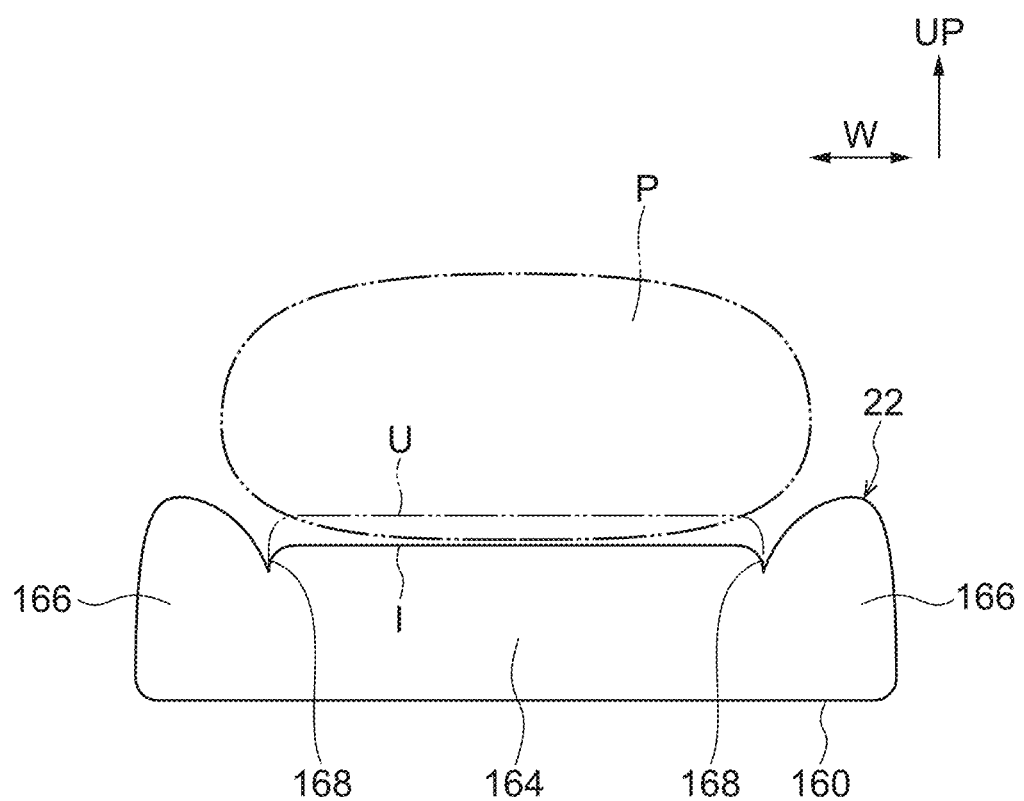
FIG. 9 is a sectional view of the seat cushion shown in FIG. 7, showing a state in which the seat cushion is cut along line 9-9 in FIG. 7.
Figure 10:
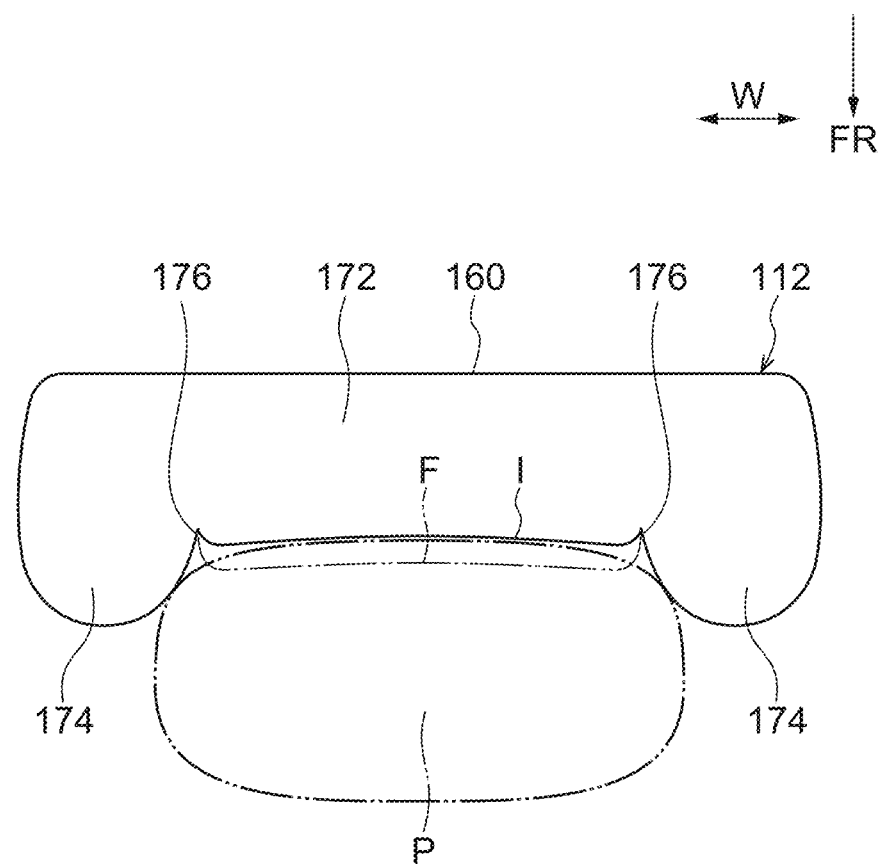
FIG. 10 is a sectional view of the seat back shown in FIG. 7, showing a state in which the seat back is cut along line 10-10 in FIG. 7.

Because the push-up portion 82 is provided across the whole of the seat width direction, a sitting surface of the rear portion of the seat cushion 12 may be pushed up uniformly in the seat width direction, as shown in FIG. 9. Furthermore, because the push-out portion 132 is provided across the whole of the seat width direction, a sitting surface of the lower portion of the seat back 14 may be pushed out uniformly in the seat width direction, as shown in FIG. 10. Therefore, area contact between the buttock area of the seat occupant P and the vehicle seat 10 may be improved, body pressure of the seat occupant P may be dispersed, and the vehicle seat 10 may stably support the sacrum area S of the seat occupant P regardless of the body shape of the seat occupant P.

Figure 11:
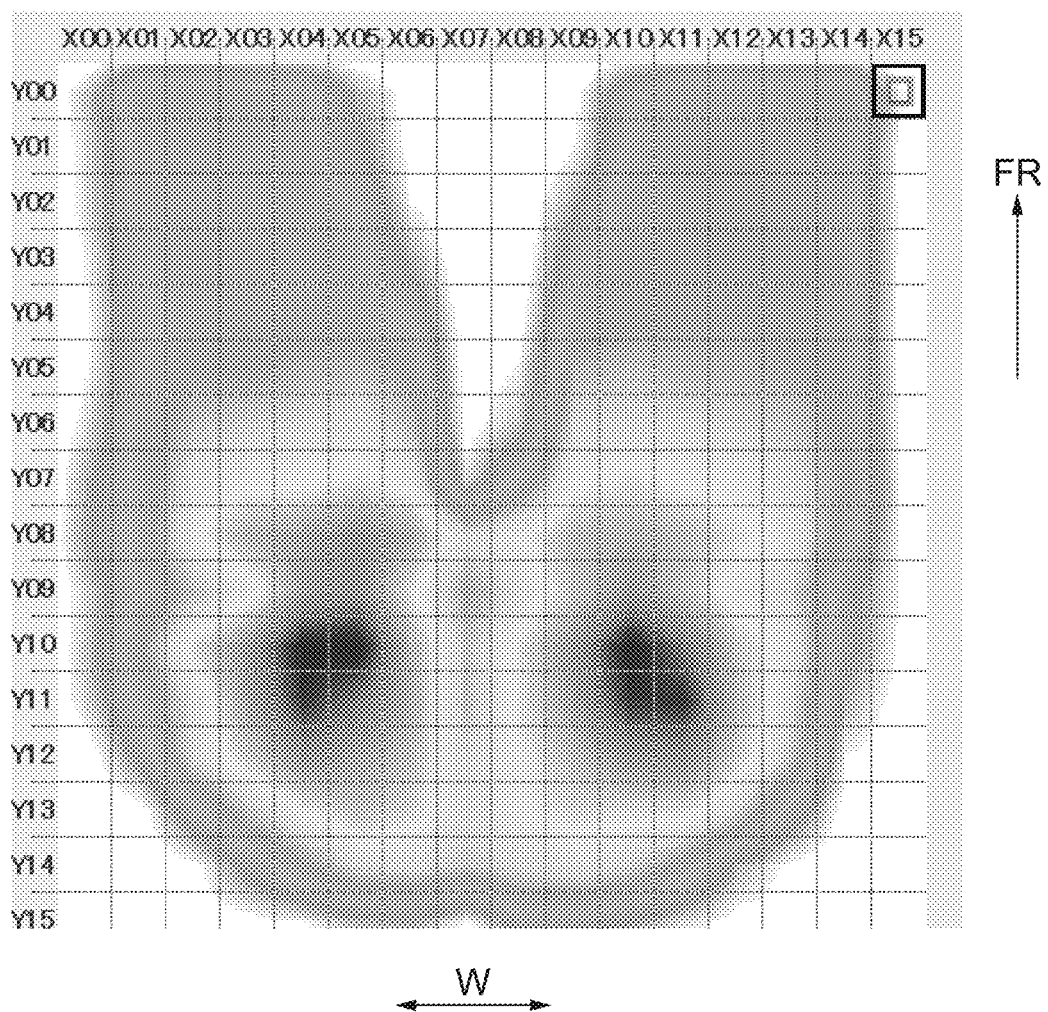
FIG. 11 is a contour diagram showing a body pressure distribution of a seat occupant on the seat cushion according to the present exemplary embodiment prior to the seat rear portion of the seat cushion being pushed up.
Figure 12:
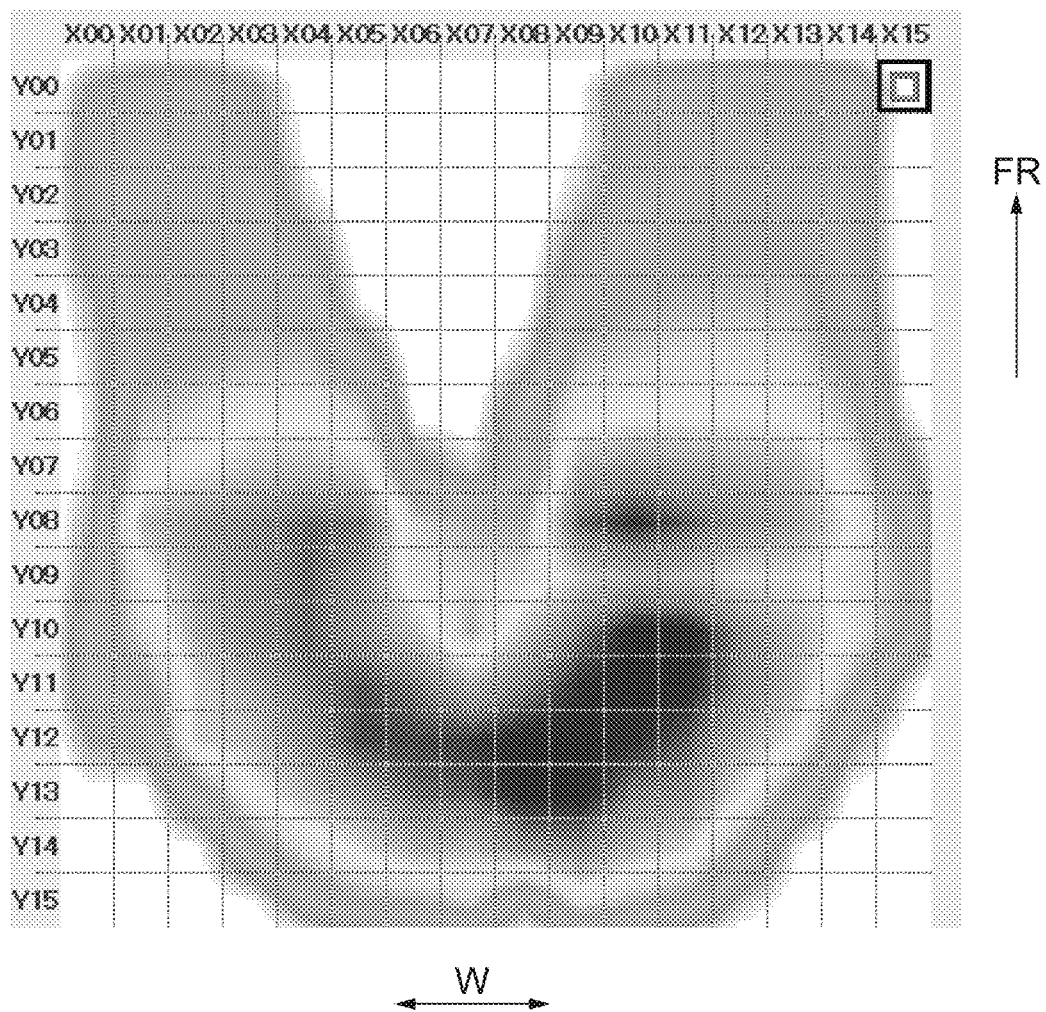
FIG. 12 is a contour diagram showing a body pressure distribution of the seat occupant on the seat cushion according to the present exemplary embodiment subsequent to the seat rear portion of the seat cushion being pushed up.

FIG. 11 shows a contour diagram of a body pressure distribution of the buttock area of the seat occupant P when the gap C between the joint region of the seat cushion 12 and seat back 14 and the seat occupant P (see FIG. 8) is large. The vertical axis in FIG. 11 represents the seat front-and-rear direction and the horizontal axis represents the seat width direction. The black regions (dark-toned regions) in FIG. 11 depict conditions where pressure is high. When the gap C between the joint region of the seat cushion 12 and seat back 14 and the seat occupant P is large, the buttock area and sacrum area S of the seat occupant P are not stably supported. Consequently, the body pressure of the seat occupant P is concentrated locally (in particular regions; i.e., a left and right two-point concentrated distribution). In contrast, when the gap C between the joint region of the seat cushion 12 and seat back 14 and the seat occupant P is small, as shown in FIG. 12, the buttock area and sacrum area S of the seat occupant P are stably supported. The vertical axis in FIG. 12 represents the seat front-and-rear direction and the horizontal axis represents the seat width direction. The black regions (dark-toned regions) in FIG. 12 depict conditions where pressure is high. Thus, the body pressure of the seat occupant P is dispersed in a "U"-shaped distribution, and discomfort or pain of the seat occupant P may be moderated.

According to the vehicle seat 10 according to the present exemplary embodiment, as shown in FIG. 9, the first slit portions 168 and the second slit portion 170 (see FIG. 5) are provided in the cushion pad 22. Consequently, tension in the cushion pad 22 when the rear portion of the seat cushion 12 is being pushed up to the seat upper side by the seat cushion push-up mechanism 80 may be reduced, and the seat cushion 12 may be put into area contact with the buttock area of the seat occupant P more effectively. Moreover, as shown in FIG. 10, the back slit portions 176 are provided in the back pad 112. Consequently, tension in the seat back 14 when the lower portion of the seat back 14 is being pushed out to the seat front side by the seat back push-out mechanism 130 may be reduced, and the seat back 14 may be put into area contact with the buttock area of the seat occupant P more effectively.

According to the vehicle seat 10 according to the present exemplary embodiment, the push-up portion 82 is driven and moved up and down by the push-up driving portion 90 that structures the seat cushion push-up mechanism 80. More specifically, the rear portion of the seat cushion 12 may be pushed up to the seat upper side, and the pushed-up rear portion of the seat cushion 12 may be pulled down. In addition, the push-out portion 132 is driven and moved to front and rear by the push-out driving portion 134 that structures the seat back push-out mechanism 130. More specifically, the lower portion of the seat back 14 may be pushed out to the seat front side, and the pushed-out lower portion of the seat back 14 may be pulled back. Thus, the seat back 14 may be put into area contact with the buttock area of the seat occupant P assuredly.

As described above, the vehicle seat 10 according to the present exemplary embodiment may moderate discomfort, pain and the like of the seat occupant P in long-duration running.

Further, according to the vehicle seat 10 according to the present exemplary embodiment, the seat cushion push-up mechanism 80 and/or the seat back push-out mechanism 130 may be moved periodically employing, for example, a timer function incorporated in the CPU constituting the ECU 180. More specifically, the ECU 180 employing the timer function incorporated in the CPU causes the first motor 94 and the second motor 146 to operate periodically. Thus, the push-up portion 82 of the seat cushion push-up mechanism 80 is repeatedly pushed up and pulled down in cycles, and the push-out portion 132 of the seat back push-out mechanism 130 is repeatedly pushed out and pulled back in cycles. Therefore, body pressure of the seat occupant P may be modified periodically, as a result of which discomfort, pain and the like of the seat occupant P in long-duration running may be moderated even more effectively.

The ECU 180 may monitor body pressure distributions of the seat occupant P obtained from the pressure sensors 178 that are electronically connected to the ECU 180. When a particular body pressure distribution continues for a predetermined duration, the ECU 180 may cause the first motor 94 and second motor 146 to operate. Thus, the body pressure distribution of the seat occupant P may be modified.

According to the vehicle seat 10 according to the present exemplary embodiment, the formed wires 52 are employed as the push-up wire 84 and push-out wire 138 structuring the push-up portion 82 and push-out portion 132. Therefore, the seat cushion push-up mechanism 80 and the seat back push-out mechanism 130 may be constituted easily and an increase in fabrication costs may be suppressed.

Herein, the push-up portion 82 is described as being structured by the push-up wire 84 using the formed wire 52, but this is not limiting. Another member that is turnably attached to the push-up driving portion may be employed as the push-up portion.

Moreover, the push-out portion 132 is described as being structured by the push-out wire 138 using the formed wire 52, but this is not limiting. Another member that is turnably attached to the push-out driving portion may be employed as the push-out portion.

What is claimed is:

1. A vehicle seat comprising:
a left and right pair of cushion frames that structure a framework of a seat cushion, the seat cushion including a pad main body portion that supports a buttock area and thigh area of a seat occupant;
a left and right pair of seat back frames that structure a framework of a seat back, the seat back standing from a seat rear end side of the seat cushion, the seat back being supported to be tiltable in the seat front-and-rear direction about a rotation axis that is a side of the seat back at which a connection portion thereof with the left and right pair of cushion frames is disposed, and the seat back including a back pad main body portion that supports a back area of the seat occupant; and
at least one of:
a seat cushion push-up mechanism that is provided inside the seat cushion uniformly across a whole of the pad main body portion in the seat width direction and that is capable of pushing only a rear portion of the seat cushion up to the seat upper side without moving a front portion of the seat cushion up or down, or
a seat back push-out mechanism that is provided inside the seat back uniformly across a whole of the back pad main body portion in the seat width direction and that is capable of pushing only a lower portion of the seat back out to the seat front side without moving an upper portion of the seat back to front or rear, the lower portion of the seat back including a region opposing a sacrum area of the seat occupant.

2. The vehicle seat according to claim 1, wherein the rear portion of the seat cushion can be pushed up so as to be angled to the seat upper side toward the seat rear side.

3. The vehicle seat according to claim 1, wherein the lower portion of the seat back can be pushed out so as to be angled to the seat front side toward the seat lower side.

4. The vehicle seat according to claim 1, wherein the seat cushion comprises a cushion pad including:
the pad main body portion;
a left and right pair of pad side portions provided at the sides at both ends in the seat width direction of the pad main body portion;
a left and right pair of first slit portions provided at the rear portion of the seat cushion along boundaries between the pad main body portion and the left and right pair of pad side portions; and
a second slit portion provided along the seat width direction at a rear end portion of the pad main body portion.

5. The vehicle seat according to claim 1, wherein the seat back comprises a back pad including:
the back pad main body portion;
a left and right pair of back pad side portions provided at the sides at both ends in the seat width direction of the back pad main body portion; and a left and right pair of back slit portions provided at the lower portion of the seat hack along boundaries between the back pad main body portion and the left and right pair of back pad side portions.

6. The vehicle seat according to claim 1, wherein the seat cushion push-up mechanism comprises:
a push-up portion provided at the rear portion of the seat cushion across the whole of the pad main body portion in the seat width direction, the push-up portion pushing the rear portion of the seat cushion up to the seat upper side; and
a push-up driving portion that is provided at the seat cushion and drives the push-up portion to cause the push-up portion to move up and down.

7. The vehicle seat according to claim 1, wherein the seat back push-out mechanism comprises:
a push-out portion provided at the lower portion of the seat back across the whole of the back pad main body portion in the seat width direction, the push-out portion pushing the lower portion of the seat cushion out to the seat front side; and
a push-out driving portion that is provided at the seat back and drives the push-out portion to cause the push-out portion to move to front and rear.

* * * * *